UNITED STATES PATENT OFFICE.

LAURENCE G. WESSON, OF CHEVY CHASE, MARYLAND.

COMPOSITION FOR LIBERATING SULFUR DIOXID.

1,356,029.     Specification of Letters Patent.     Patented Oct. 19, 1920.

No Drawing.     Application filed May 31, 1919.     Serial No. 300,965.

*To all whom it may concern:*

Be it known that I, LAURENCE G. WESSON, a citizen of the United States of America, residing at Chevy Chase, in the county of Montgomery and State of Maryland, have invented certain new and useful Improvements in Compositions for Liberating Sulfur Dioxid, of which the following is a specification.

The present invention relates to a composition suitable for liberating sulfur dioxid by reaction of its ingredients, and aims to produce such a composition which will be stable for a long period of time when kept out of contact with moisture.

Compositions have heretofore been proposed for liberating sulfur dioxid by reaction between a sulfite or bisulfite and an acid material, such reaction being induced by allowing water to come into contact with the material. In such compositions sodium sulfite or sodium bisulfite have been proposed as the source of material containing the $SO_2$ group, and sodium bisulfate has been proposed as the acid ingredient of the mixture. Such compositions, however, are open to the great objection that both sodium sulfite and sodium bisulfite at ordinary room temperatures are unstable, these materials taking up oxygen from the atmosphere to be converted into sodium sulfate and sodium bisulfate. Such objection is overcome in the present invention, in accordance with which sodium metabisulfid is preferably employed as the source of $SO_2$. Obviously other metabisulfites can be employed and especially the metabisulfites of the alkali metals.

As a specific example of the present invention, the following is given, the same being intended in an illustrative and not a restrictive sense: 190 parts by weight of sodium metabisulfite require for complete reaction 240 parts of sodium bisulfate or 222 parts of sodium pyrosulfate. The reactions which take place and the theoretical quantities of the starting materials are given as follows, sodium bisulfate being used in the first example:—

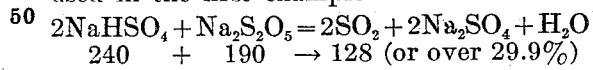

When sodium pyrosulfate is used the following reaction takes place:

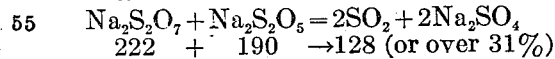

Sodium bisulfate and sodium pyrosulfate are both hygroscopic and take up moisture from the atmosphere with avidity, thereby causing the liberation of $SO_2$ from the mixture. The material will readily take up a sufficient amount of moisture to produce, at the end of the operation, a pasty or liquid mass. It will be understood that when sodium pyrosulfate is employed, this first takes up water with the formation of sodium bisulfate.

While sodium bisulfite, $HNaSO_3$, is unstable and gives off $SO_2$ slowly in the atmosphere and for laboratory use ordinarily has to be kept in a glass stoppered bottle, sodium metabisulfite $Na_2S_2O_5$ is stable, has no appreciable smell of $SO_2$ and is ordinarily sold and kept in cork stoppered bottles.

Sodium metabisulfite can readily be produced in a state of high purity. Sodium bisulfate and sodium pyrosulfate can both be obtained cheaply from niter cake, these crude materials having a purity around 90%. It is accordingly convenient to prepare mixtures of sodium metabisulfite with sodium bisulfate or pyrosulfate, which mixtures have a purity of about 95%. In these two cases the products would contain respectively about 28.5 and about 29.5% of available $SO_2$, if the two materials are mixed in chemically equivalent quantities. With the crude materials, and allowing an excess of, say, 10% of one of the ingredients, mixtures can readily be produced containing as a minimum, respectively about 26.8% and 28.15% of available $SO_2$. It is to be noted when employing sodium bisulfite as the source of $SO_2$, even if chemically equivalent quantities of materials are employed, the product would not contain over 28.6% of $SO_2$, and less than this amount of the entire quantity would be available since the bisulfite is unstable, and oxidizes slowly to bisulfate even in dry air. In accordance with the present invention the pyrosulfate is the preferred material to employ, and mixtures containing about 30% of available $SO_2$ can readily be produced as an article of commerce.

The dry and preferably pulverulent mixture can be used for the production of $SO_2$ for bleaching, disinfection or any other desired purpose, by merely pouring out a desired quantity of the same into a suitable open receptacle, and placing the same in a room which is to be disinfected, or by placing the same into a compartment containing moist or wet material which it is desired to bleach. It is not necessary to do anything further, but if rapid liberation of $SO_2$ is wanted, liquid water can be added to the mixture. In some cases also a greater excess of the bisulfite or metabisulfite can be used in the first instance, and acidulated water can be added to the mixture. This, however, does not ordinarily possess any advantage except that the mixture contains a higher percentage of available $SO_2$. The mixture also can be made up into suitable cakes or blocks for convenience in using, when so desired.

The mixture can be kept for a nearly indefinite period in a dry atmosphere, and the material can be shipped in air-tight metal boxes or paraffined cartons, and will keep for a long period, especially when the metabisulfite is used.

It will, accordingly, be seen that I have, in accordance with the present invention, produced a stable, permanent, cheap and efficient material for the production of $SO_2$.

While I have referred herein to the employment preferably of bisulfate and pyrosulfate, the invention is not restricted thereto, since other solid acids or solid materials can be used, examples being boric acid, oxalic acid, citric acid, tartaric acid, salicylic acid, superphosphate of lime or others. If mixtures of the metabisulfite with these acid substances are to be used by allowing atmospheric moisture to act thereupon, a hygroscopic material such as $CaCl_2$ may be advantageously added.

In certain of the appended claims the expression "alkali metal bisulfate having some of its water of constitution removed" is intended to cover both the pyrosulfate and the bisulfate with a part only of its water removed.

I claim:

1. A substantially dry hygroscopic composition of matter comprising a mixture including a solid acid material and a metabisulfite.

2. A substantially dry composition of matter comprising a mixture including a solid hygroscopic acid material and a metabisulfite.

3. A substantially dry composition of matter comprising a hygroscopic mixture including a solid acid salt and a metabisulfite.

4. A composition of matter comprising a pyrosulfate and a metabisulfite, such mixture when exposed to damp air, being capable of evolving substantially its entire content of $SO_2$.

5. A composition of matter comprising an alkali metal pyrosulfate and an alkali metal metabisulfite.

6. A composition of matter comprising a hygroscopic mixture of approximately chemically equivalent quantities of a dry solid acid material and a metabisulfite.

7. A composition of matter comprising a mixture of approximately chemically equivalent quantities of a dry solid acid material and a metabisulfite, such last mentioned material being in slight excess.

8. A mixture containing approximately equimolecular amounts of an alkali metal bisulfate having some of its water of constitution removed, and a metal bisulfite.

9. A mixture containing approximately equimolecular amounts of an alkali metal bisulfate having some of its water of constitution removed, and a metabisulfite, such mixture having a slight excess of such last mentioned substance.

10. A dry solid mixture, stable in dry air, at ordinary room temperature, capable of evolving not substantially less than 29.5% of its weight of $SO_2$, upon treatment with water.

11. A dry solid mixture, stable in dry air, at ordinary room temperature, capable of evolving not substantially less than 30% of its weight of $SO_2$, upon treatment with water.

12. A dry solid mixture, stable in dry air, at ordinary room temperature, capable of evolving not substantially less than 31% of its weight of $SO_2$, upon treatment with water.

13. A dry mixture, stable in dry air at ordinary temperature, capable when treated with water, of liberating substantially more than 28.6% of its weight of sulfur dioxid.

14. A composition of matter comprising a mixture of approximately chemically equivalent quantities of a pyrosulfate and a metabisulfite.

In testimony whereof I affix my signature.

LAURENCE G. WESSON.